July 25, 1933.  H. W. MELLING  1,919,738
LATHE
Filed Dec. 21, 1931  8 Sheets-Sheet 1

Fig. 1

INVENTOR
Herman W. Melling
BY
Chappell Earl
ATTORNEYS

July 25, 1933.　　　H. W. MELLING　　　1,919,738
LATHE
Filed Dec. 21, 1931　　　8 Sheets-Sheet 3

INVENTOR
Herman W. Melling
BY Chappell & Earl
ATTORNEYS

July 25, 1933.  H. W. MELLING  1,919,738
LATHE
Filed Dec. 21, 1931  8 Sheets-Sheet 4

Fig. 4

INVENTOR
Herman W. Melling
BY Chappell & Earl
ATTORNEYS

Fig. 5

Patented July 25, 1933

1,919,738

UNITED STATES PATENT OFFICE

HERMAN W. MELLING, OF JACKSON, MICHIGAN

LATHE

Application filed December 21, 1931. Serial No. 582,285.

The main objects of this invention are:
1. To provide an improved lathe in which the parts are so arranged that the stresses upon the work and the machine are relatively slight.
2. To provide an improved lathe which is adapted for automatically machining crankshafts, such as the crankshafts of internal combustion engines, which is of very large capacity.
3. To provide an improved lathe for machining crankshafts, which is very accurate.
4. To provide an improved lathe of the class described which rough cuts and finishes the crank pins.
5. To provide a lathe of this type which turns and finishes the pins and cheeks of the crankshafts.

In the accompanying drawings, I have illustrated my improvements as embodied in a lathe for machining crankshafts. It is to be understood, however, that my improvements are desirable and adaptable for machining other kinds of work.

Objects relating to details and economies of my invention will appear from the description to follow. The invention is defined and pointed out in the claims.

A structure which is a preferred embodiment of my invention is illustrated in the accompanying drawings, in which.

Figure 4:
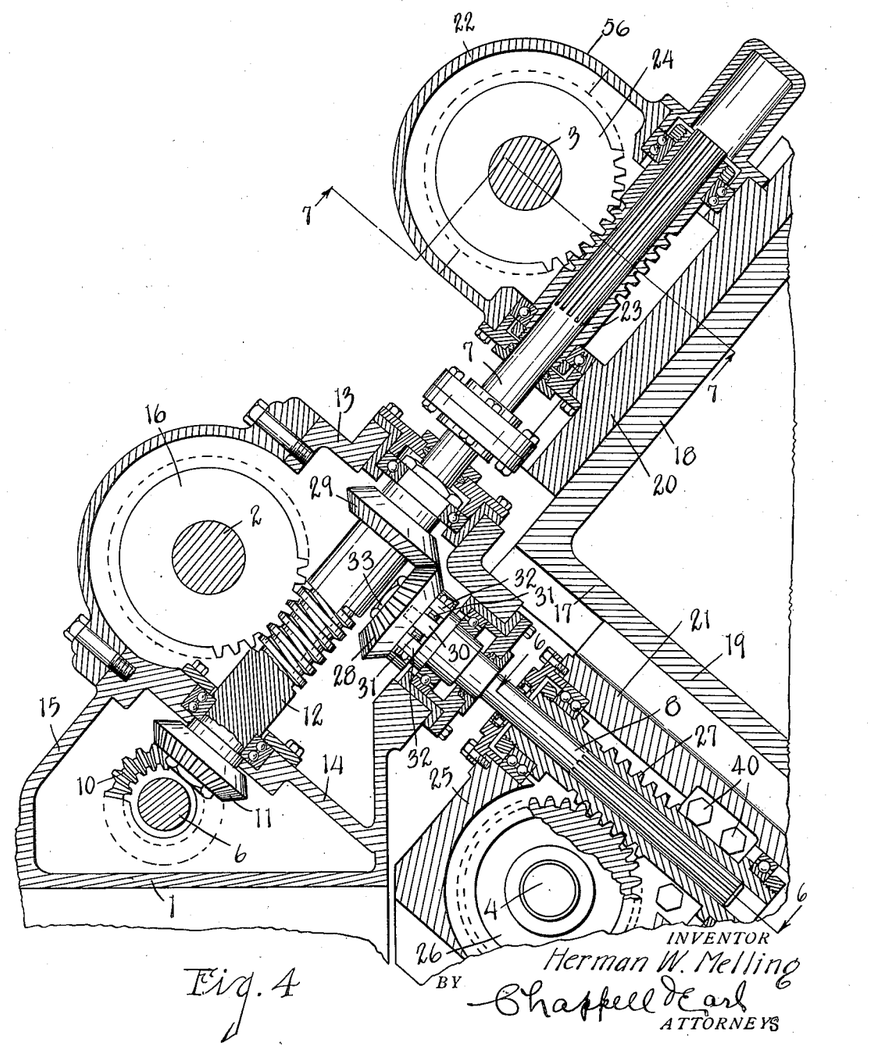
Fig. 4 is an enlarged fragmentary transverse section on line 4—4 of Fig. 1.
Figure 5:
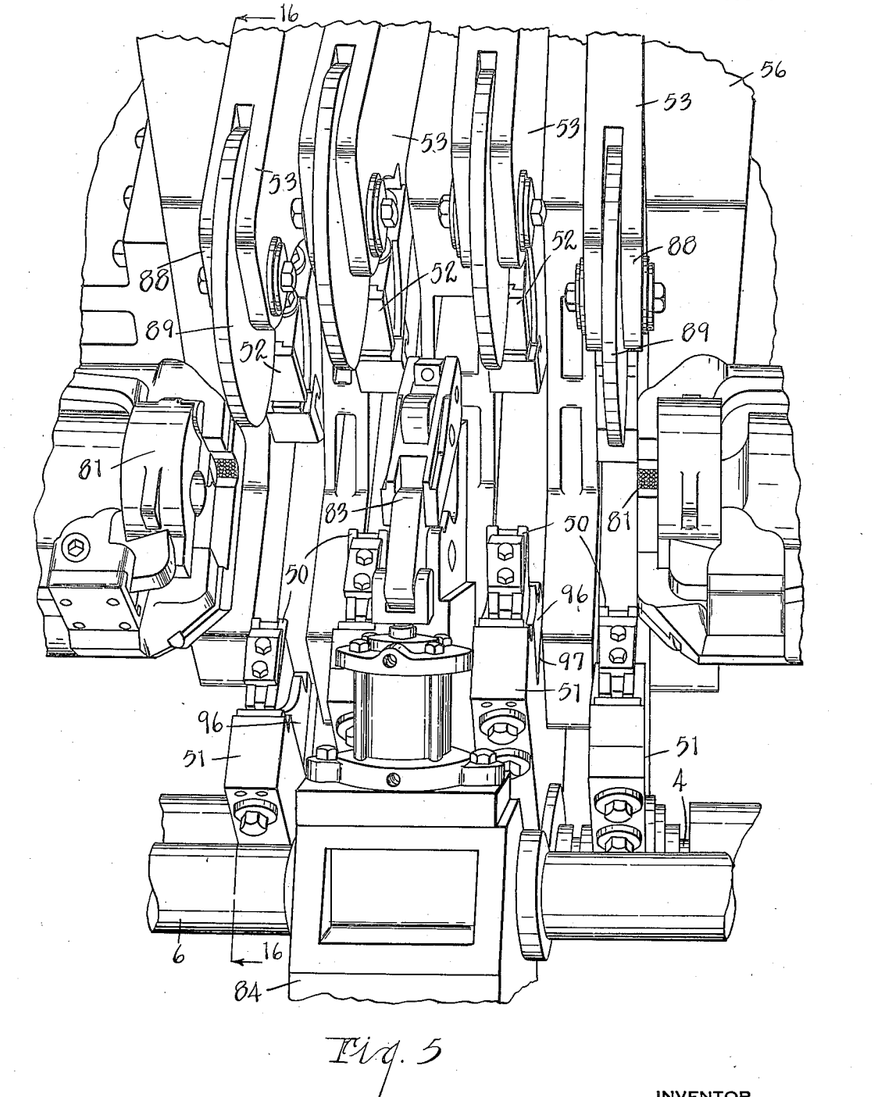
Fig. 5 is an enlarged fragmentary front perspective view illustrating the cutting mechanism.

Referring to the drawings, numeral 1 indicates the supporting frame generally. The work spindles 2 and the eccentric upper and lower tool carriage shafts 3 and 4 are driven by the electric motor 5 through the main drive shaft 6 and intermediate drive shafts 7 and 8. The motor 5 is connected to the main drive shaft 6 by suitable reduction gears disposed within the housing 9. Referring particularly to Fig. 4, the main drive shaft 6 is provided with bevel gears 10 which mesh with bevel gears 11 carried by the lower ends of worm shafts 12 that are suitably journaled to the upper wall 13 and the intermediate wall 14 of the spindle housings 15.

The work carrying spindles 2 are provided with pinions 16 which mesh with the worm gear of the worm shafts 12 whereby the spindles are driven by the main drive shaft 6.

The end members 17 of the main frame are provided with angularly related inclined upper and lower ways 18 and 19, respectively, for the feed slides 20 and 21.

The upper feed slides 20 are provided with bearing housings 22 to which the ends of the eccentric or crank shaft 3 are journaled and also the worm sleeves 23 which are provided with worm gears meshing with the pinions 24 keyed to the eccentric shaft 3. The worm sleeves 23 are provided with internal splines for permitting the reciprocation of the feed slides 20. The feed slides 20 and the master crank shaft 3 constitute the upper tool feed carriage 56.

Figures 6, 7, 8, 9:
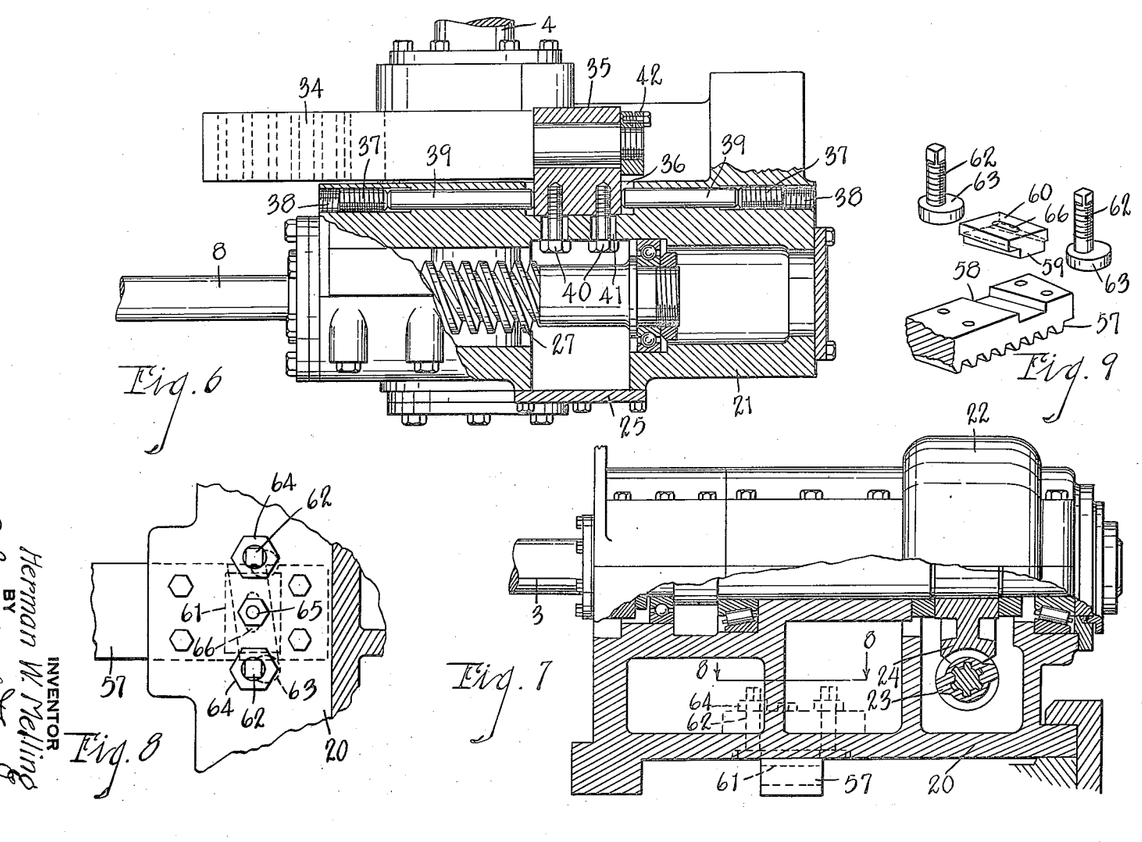
Fig. 6 is an enlarged fragmentary detail of the adjustable carriage feeding mechanism partially in elevation and partially in section on a line corresponding to line 6—6 of Figs. 2 and 4.
Fig. 7 is an enlarged fragmentary view of the feeding mechanism mainly in section on line 7—7 of Fig. 4.
Fig. 8 is an enlarged fragmentary view taken on a line corresponding to line 8—8 of Fig. 7, illustrating details of the rack adjusting means.
Fig. 9 is a perspective view of the parts of the rack adjusting mechanism illustrated in Figs. 7 and 8.

Similarly, the lower feed slides 21 are provided with bearing housings 25 to which the ends of the lower eccentric or crank shaft 4 are journaled, constituting the lower tool feed carriage 561. At its ends, the shaft 4 is provided with pinions 26 which mesh with the worm sleeves 27, that is, journaled in the bearing housings 25 and splined to the lower drive shafts 8, as illustrated by Figs. 4 and 6. The lower drive shafts 8 are provided with bevel gears 28 which mesh with the bevel gears 29 provided on the worm shafts 12. Each of the bevel gears 28 are carried by the lower drive shafts 8 for rotatable adjustment and for this purpose the gears are provided with rearwardly extending studs 30 which are disposed between the ends of screws 31 which are threaded to the upstanding ends of the collar 32 which is fixed to the shaft 8. The bevel gear 28 is held on the upper end of shaft 8 by nut 33. The shaft 8 is adjusted relative to the bevel gear 28 by merely turning the screws 31.

The lower feed slides 21, as illustrated by Fig. 6, have adjustably connected thereto feed racks 34 which are adapted to be adjusted relative to the slides. This adjustment is effected by adjusting the position of the movable block 35 within its slide 36 through the adjustable screws 37 threaded to suitable openings 38 in the slides 21. The screws 37 engage the pins 39 which in turn engage the movable blocks 35. The blocks 35 are secured to the slides 21 by the locking screws 40 which extend through suitable slots 41 for permitting the adjustment of the blocks 35 in their ways 36. The ends of racks 34 are secured to the blocks 35 by nuts 42.

Figures 3, 14, 15:
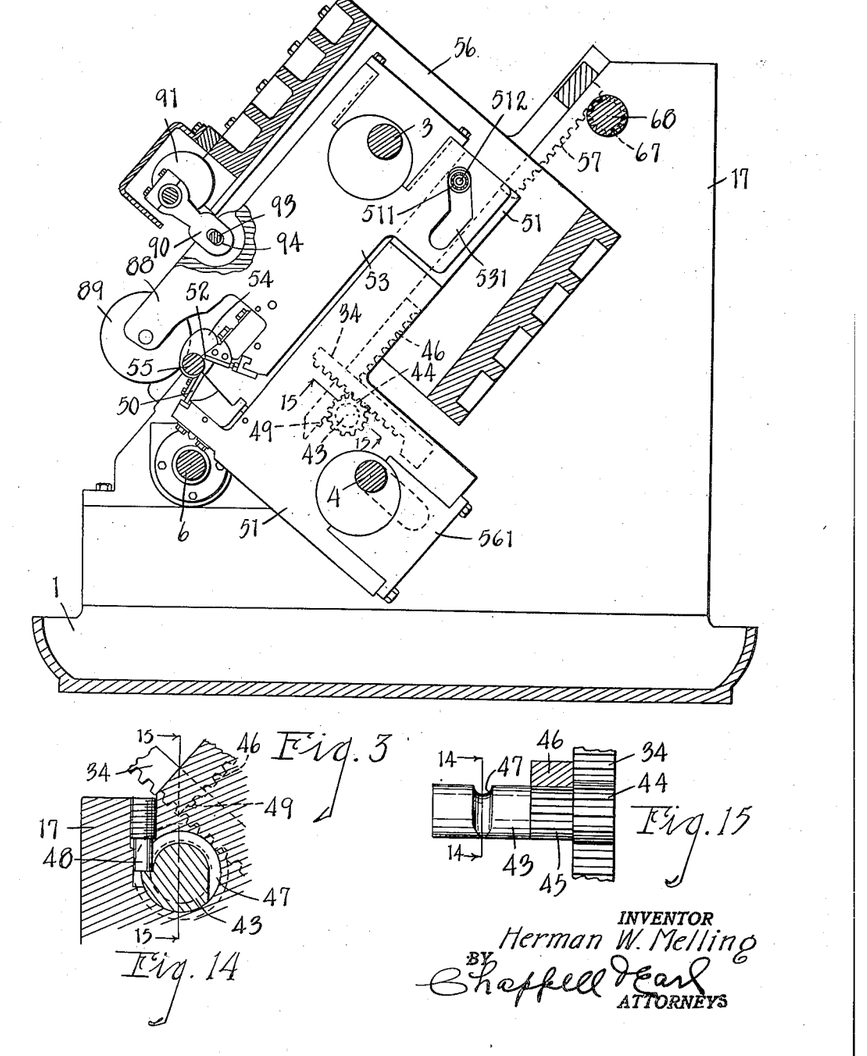
Fig. 3 is an enlarged fragmentary transverse section on a line corresponding to line 3—3 of Fig. 1.
Fig. 14 is an enlarged detail section illustrating the adjustable pinion stop taken on line 14—14 of Fig. 15.
Fig. 15 is a detail view showing the relation of the tool feed carriage racks and the pinion.

The lower feed racks 34, as illustrated by Figs. 3, 14, and 15, are each driven through a stub shaft 43 which is provided with a pinion gear 44 meshing with the rack 34. The stub shaft 43 itself has a pinion gear 45 cut therein adjacent to the pinion 44 for coaction with the upper feed rack 46. At its inner end, the stub shaft 43 is provided with a segmentary peripheral groove 47, the ends of which constitute stops for limiting the rotational movement thereof. The ends of the groove 47 coact with the inner end of the adjustable stop 48 which is threaded into a suitable bore in the end wall 17.

The lower end of the upper feed rack 46 is provided with a half tooth 49 which is adapted to slide over the pinion 45 on the upward stroke of the rack slightly before the end of groove 47 engages the stop 48 so as to prevent injury to the gears or the stub shaft. On the down stroke of the upper rack 46, however, the half tooth 49 cooperates with the next tooth to distribute the shearing forces acting on the teeth in turning the stub shaft 43.

The pinion 44 is slightly larger in diameter than the pinion gear 45 so that the finishing tools 50 carried by the lower tool carriers 51 feed into the work slightly faster than the rough cutting tools 52 carried by the upper tool carriers 53, the arrangement being such that the last revolution of the crankshaft 54 finishes the turning of the crankshaft pins 55.

The slides 20 support the upper feed or tool carriage 56 while the slides 21 support the lower feed or tool carriage 561.

The upper tool carriers 53 (Fig. 3) are provided with angular slots 531 in which is disposed the roller bearing 511, the spindles 512 of which are journaled to the corresponding lower tool carriers 51. This connection constitutes rear supports for the lower tool carriers without interfering with their freedom of movement under the influence of the lower master crankshaft 4 and the lower feed carriage.

The racks 46 are fixed to the upper feed carriage so that the lower feed carriage is moved in synchronism with the movement of the upper feed carriage as described. The upper feed slides 20 are provided with feed racks 57 which are adjustably connected thereto, as illustrated by Figs. 7 to 9, inclusive. Referring to these figures, each rack 57 is provided with an inclined slot or groove 58 which is engaged by the inclined tongue 59 of the block 60 which is carried in a suitable groove 61 provided in the bottom of the slide 20. For adjusting the block 60 transversely whereby to change the longitudinal position of the rack 57 relative to the slide 20, the latter is provided with studs 62 having eccentric thrust members 63 at their lower ends engaging the ends of the block 60. After adjustment, the studs 62 are locked in position by nuts 64 and the block 60 is secured in place to the carriage by the locking bolt 65, the block 60 being slotted at 66 for permitting its adjustment without the removal of bolt 65.

Figure 1:
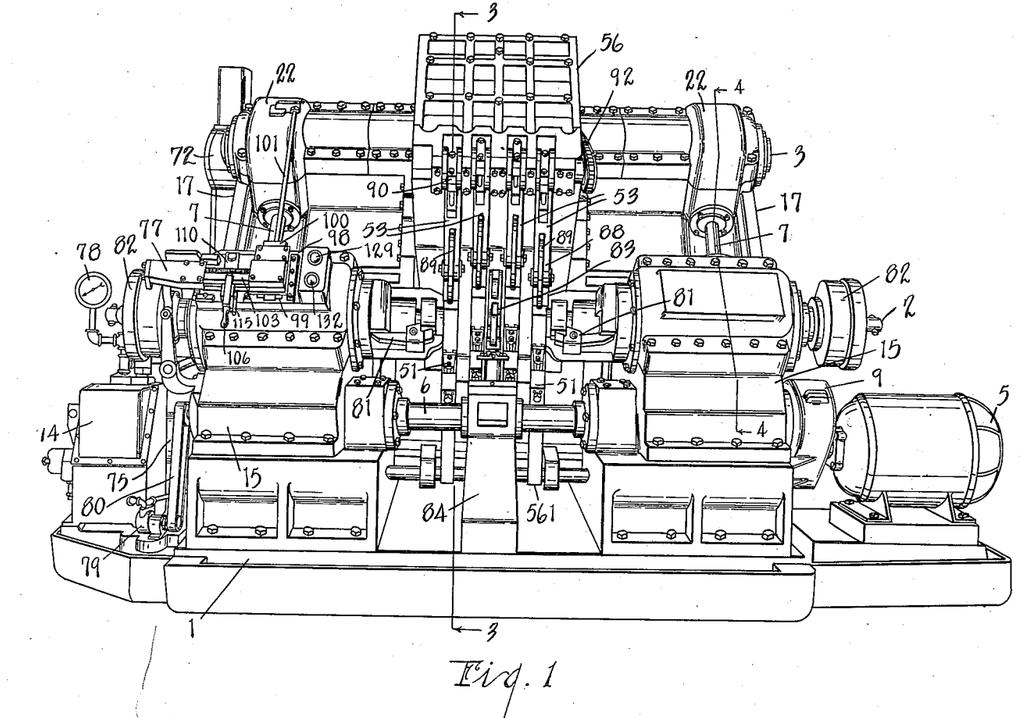
Fig. 1 is a front perspective view of a lathe embodying the features of my invention adapted for the machining of crankshafts.
Figure 2:
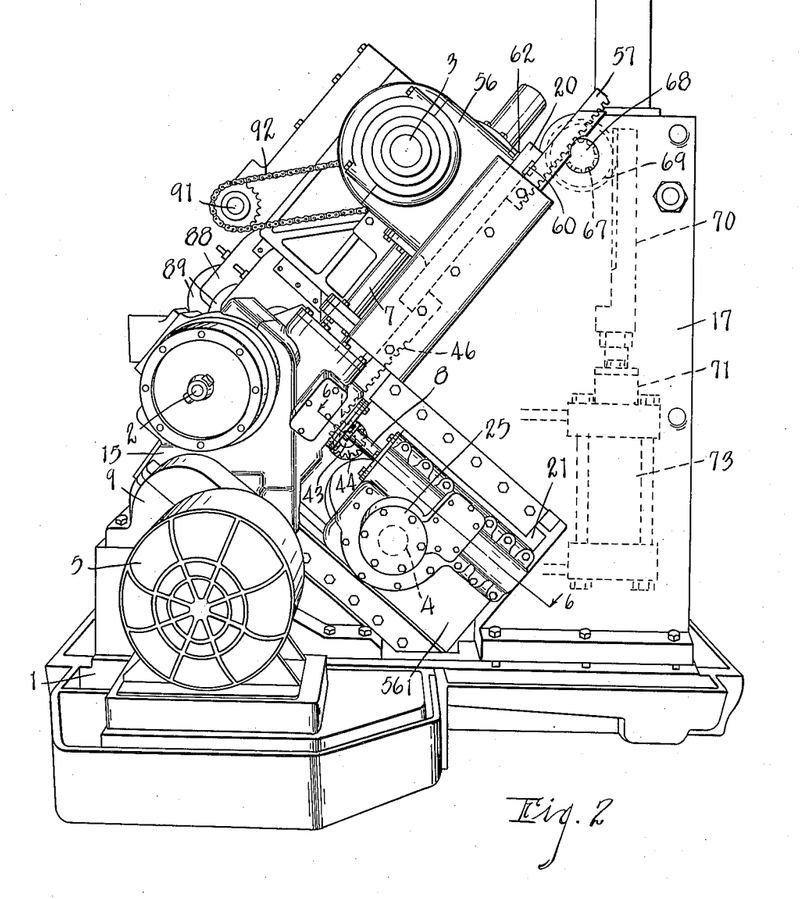
Fig. 2 is a side perspective view looking from the right of Fig. 1.

The racks 57 mesh with the pinion gears 67 provided at the ends of the upper feed shaft 68. The upper feed shaft 68, as illustrated by Fig. 2, is provided at one end with a gear wheel 69 which meshes with the vertical rack 70 carried by the piston 71. The driving pinion or gear 69 and rack 70 are provided with a suitable housing 72. The piston 71 is adapted to be reciprocated within the cylinder 73 by fluid, such as oil under pressure, produced by the oil gear pump 74 which is driven continuously as long as the machine is in operation by an electric motor 75. The operation of the piston 71 is controlled through a suitable four-way valve (not shown) by the automatic control mechanism 76, as illustrated by Figs. 10 to 13, inclusive, or the wholly manual control mechanism 77, as illustrated by Fig. 1. The pressure gauge 78 indicates the pressure of the oil on the outlet side of the pump 74.

The bearings throughout the machine are lubricated by oil under pressure from the oil pump 79 which is driven from the main drive shaft 6 through the belt 80, as illustrated by Fig. 1.

The crankshaft to be machined is secured by and between the chucks 81 which are carried by the inner ends of the spindles 2 and are adapted to be pneumatically opened and closed to engage the work by the pneumatic pumps 82. The center bearing of the crankshaft is supported by the pneumatically operated work rest 83 which is carried by the center bearing bracket 84 for the main drive shaft 6. Referring to Figs. 16 to 19, inclusive, the upper tool carriers 53 are provided with recesses 85 in which are mounted the tool supports 86 to which the upper or roughing tools 52 are clamped.

Figures 16, 17, 18, 19:
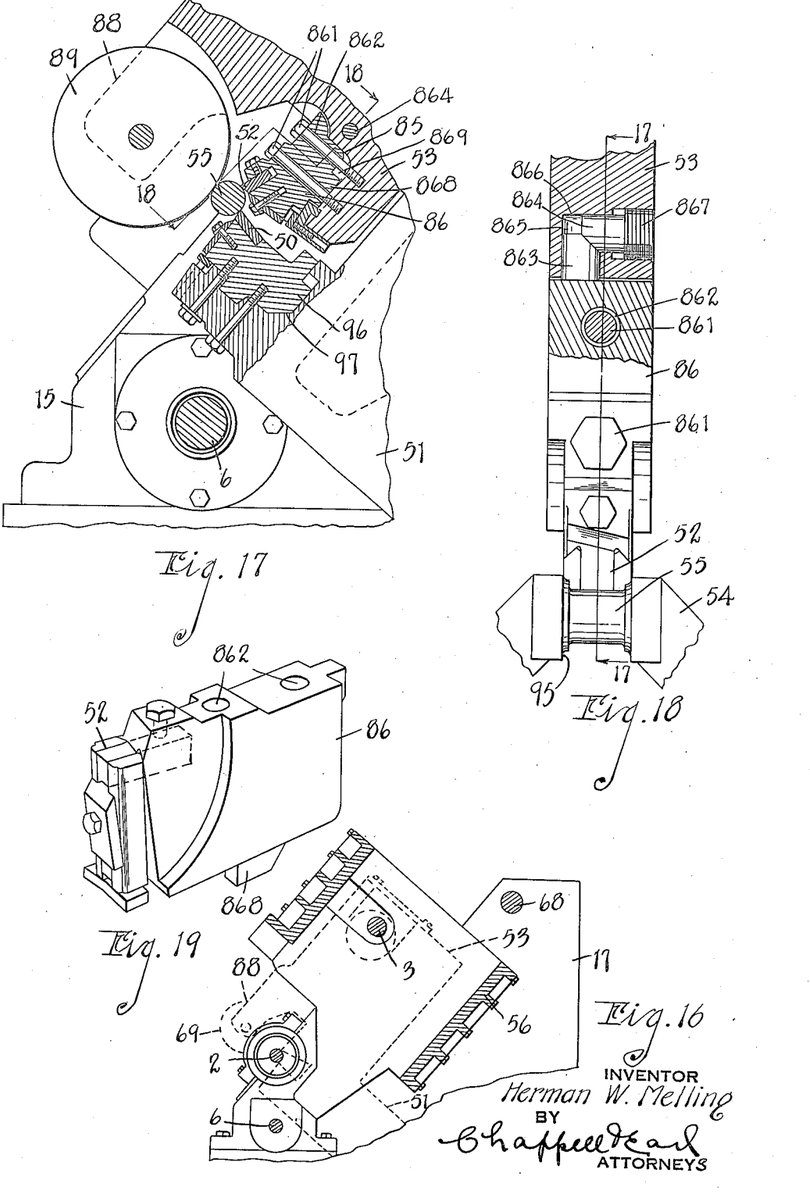
Fig. 16 is a detail section illustrating details of one of the tool carriages, taken on line 16—16 of Fig. 5.
Fig. 17 is an enlarged fragmentary section illustrating the relation of the tool carriages taken on a line corresponding to line 17—17 of Fig. 18.
Fig. 18 is an enlarged fragmentary view mainly in section taken on a line corresponding to line 18—18 of Fig. 17.
Fig. 19 is an enlarged perspective view of the adjustable tool holders illustrated in Figs. 17 and 18.

The tool supports 86 are secured to the carriers or holders 53 by the spaced screws 861, which are disposed in the enlarged openings or bores 862 through the supports 86, as shown by Fig. 17. Means are provided for adjusting the positions of the tool supports relative to the carriers, consisting of the angularly related thrust pins 863 and 864 disposed in the bores 865 and 866, respectively, of the tool carrier 53, Fig. 18. The thrust pins engage the adjusting screw 867 and the tool support 86 at their outer ends, while their inner ends are beveled, as illustrated, to change the direction of movement from one to the other. For preserving the alinement of the supports 86, when moved by the adjusting means, they are provided with depending tongues 868, which coact with grooves 869 in the carriers 53.

The tool carriers 53 are also provided with forwardly extending arms 88 to which the supporting wheels or rollers 89 are journaled for engaging the crankshaft pins 55. The details of the coaction between the cutters 52 and the rollers 89 are fully explained and claimed in my Patent, No. 1,550,914, dated August 25, 1925. In operation, the work supports the weight of the upper tool carriers 53, but when the work is removed from the machine these carriers are supported by the connecting rods or hangers 90 carried by the crank shaft 91 which, as illustrated by Fig. 1, is connected to and driven by the upper crankshaft 3 through the chain belt 92. The tool carriers 53 are connected to the hangers 90 by pins 93 which extend through slots 94 in the hangers. The slots 94 permit the unimpeded eccentric movement of the tool carriers under the influence of the crankshaft 3 and the work.

As illustrated by Figs. 18 and 19, the tools 52 are shaped and adapted to simultaneously rough cut the crankshaft pins 55 and the cheeks 95.

The lower or finishing tools 50 are supported by the tool holder 96 in the recess 97 provided therefor in the lower tool carriers 51.

Figure 10:
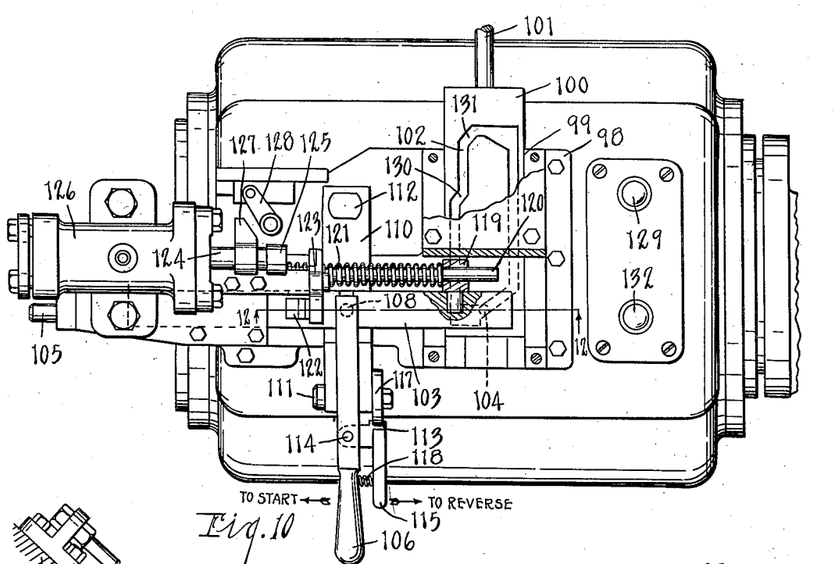
Fig. 10 is an enlarged fragmentary top plan view illustrating details of the feed control mechanism.

Referring to Fig. 10, the automatic control mechanism comprises a bed plate 98 having a way 99 for the reciprocating movement of the cam member 100 which is operated by the movement of the upper carriage 56 by or through the connecting rod 101. The cam member 100 is provided with a cam groove 102 for actuating the control slide 103 through the cam follower pin 104 which is carried by the member 103 and projects into the slot 102, as more clearly illustrated by Fig. 12. The member 103 is connected to the slidably mounted valve control rod 105 through the manual control lever 106 which is pivoted to the rod 105 at 107 and is detachably connected to the horizontal slide 103 by the pin 108 which engages the socket 109 provided therefor in the control member. The manual control lever 106 is pivoted to the bracket 110 at 111, the bracket itself being pivoted to the plate 98 at 112.

The manual control lever 106 is provided with a latch 113 pivoted thereto at 114 and having a finger piece 115 connected thereto. The latch 113 is urged into the slot 116 provided in the keeper 117 by the spring 118 disposed between the handle and the finger piece 115. To permit rotating the manual lever 106 about its pivot 111 to disengage the pin 108 from the slot 109 in the horizontal slide 103, it is necessary to disengage the latch 113 from the keeper. This disconnects the cam operated control member 103 from the valve control rod 105 for full manual operation by means of the manual lever 106. Normally, however, the manual control lever 106 is left in position with the connection established between the automatic control and the valve control rod 105.

The control member 103 is provided with a vertical stop 119 having an opening for the passage of the rod 120 which carries the compression spring 121 for urging the member 103 to the right.

Figures 11, 12, 13:
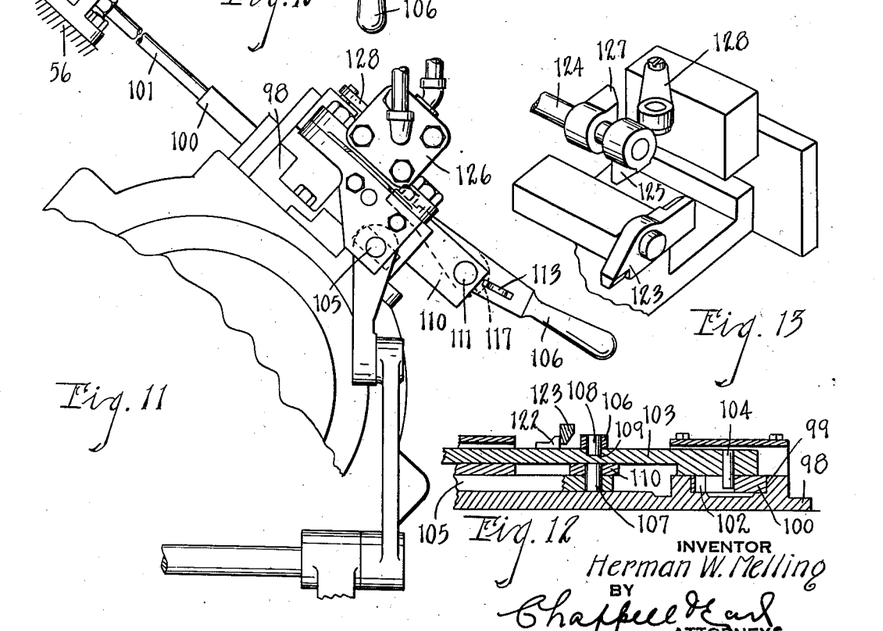
Fig. 11 is an enlarged fragmentary side elevation further illustrating these parts.
Fig. 12 is an enlarged fragmentary section on a line corresponding to line 12—12 of Fig. 10.
Fig. 13 is an enlarged fragmentary perspective view of the cut-out switch and latch tripping mechanism.

The member 103 is provided with a stop lug or keeper 122 for coaction with the pivoted latch 123 to latch the control member 103 in retracted position against the force of the compression spring 121. The pivoted latch 123 is disengaged from the lug 122 by the piston rod 124 having a cammed tappet collar 125 secured to its end for engaging and rotating the pivoted latch 123 when the piston rod 124 is moved outwardly from its cylinder 126. The piston rod 124 also carries a cammed tappet collar 127 for actuating the cut-out switch lever 128 which disconnects the motor 5 from its energizing circuit when the operating cycle of the machine has been completed. The cylinder 126 for operating the piston rod 124 is operated by pressure built up in the hydraulic feed cylinder at the end of the stroke of its piston.

The machine is set in operation by swinging the manual control lever on 106 to the left about pivot 112. This moves the valve control rod 105 to the left and operates the oil valve to connect the hydraulic feed cylinder to the pressure pump which starts the feed racks, as before described. At the same time, the push button 129 is pushed to connect the motor 5 to its energizing circuit through a suitable holding relay (not shown). As the racks move the feed carriage 56 downwardly to feed the tools to the work, the control cam 100 is also moved downwardly, the pin 104 riding in the cam groove 102 against the force of the compression spring 121. When the slide moves down sufficiently for the pin to be moved in the inclined portion 130 of the cam groove 102, the work has been more than half finished by the cutters and the movement of the pin to the right causes the valve control rod 105 to partially close the valve between the pump and the feed cylinder. This causes the feed carriages to feed more slowly until the inclined portion 131 of the cam groove 102 is reached by the downward movement of the slide 100. In this position of the slide, the downward stroke of the carriage 56 is completed, but the motor 5 continues to rotate the tool carrier crankshafts until the pressure built up by the hydraulic feed cylinder is sufficient to force the piston rod 124 outwardly against the force of spring 121 to operate the cut-off switch 128, stopping motor 5 and tripping pivoted latch 123 to permit the spring 121 to move control member 103 and pin 104 to the right hand side of the cam groove 102. In this position of pin 104, the slide 100 is free to move upwardly with the feed carriage 56 when the latter is retracted from the work.

The push button 132 is provided for starting and stopping the motor 5 as desired for inching or the like.

With the machine in loading position, the chucks and steady rest being open, the crankshaft is placed in proper position and the latches and chucks are closed. The feed lever is then moved to the left and the push button is operated as described above and the machine automatically faces the cheeks and turns the pins to the desired diameter, returns the carriages to their initial positions, and stops the work spindles in their loading position. The finished crankshaft is then removed from the machine which is ready for another crankshaft to be finished.

While the machine is automatically operated, it can be operated by hand when desired, it being possible to stop the feed at any part of the cycle and return the carriages to their loading positions. It is also possible to stop the spindles at any point in the cycle of operation, but they should not be stopped without also stopping the feed. The inching switch makes it possible to turn the spindles to any desired position.

In the operation of the machine, the crankshaft if held between the rotating work spindles by the air operated chuck and the steady rests which are also air operated. If desired, the air operated devices may be operated by hydraulic pressure. Power is applied to both work spindles and to both ends of the master crankshafts.

The machine is provided with two sets of carriage or tool carriers which are carried in a housing that is mounted between the two upper crankshaft housings and is bolted securely to them, making a very rigid compact carriage that takes the side thrust of both sets of tool carriers and by means of which the upper set of tools are fed into the work.

The lower tool carriers are driven by the lower crankshaft and they are carried between the two lower worm gear housings which are mounted on ways in the sides of the columns that support the upper carriage assembly.

The tools on the upper arms rough the cheeks, rough turn the pins and pin walls, while those mounted on the lower arms finish turn the cheeks and pin walls of the crankshaft. The cutting tools are so mounted that changing or adjusting them is a very short operation.

With the parts arranged and cooperating as illustrated and described, the machines are of very large capacity and completely face the cheeks and turn the crank pins without manual control or adjustment for the several operations. Further, the strain upon the work is minimized; that is, there is a minimum tendency for the cutters to distort or spring the work, which results in accuracy as well as eliminating undesirable strains.

I have illustrated my improvements as embodied in machines for turning crankshafts having four throws. It will be understood that my improvements are readily adapted to various types of crankshafts. Certain features of my invention are also desirable and readily adapted for use in lathes designed for other purposes. I have not, however, attempted to illustrate or describe such adaptations or embodiments as it is believed that this disclosure will enable those skilled in the art to embody or adapt my improvements as may be desired.

Having thus described my invention, what I claim as new and desire to secure by Letters Patent, is:

1. In a machine of the class described, the combination of a supporting frame having angularly related ways, upper and lower tool feed carriages slidably coacting with said ways, upper and lower master crankshafts carried by said carriages, upper and lower tool carriers journaled to the throws of said master crankshafts, an upper tool carrier supporting crankshaft for supporting the upper tool carriers independently of the work, rollers journaled to the upper tool carriers for engaging the work opposite the upper and lower tools and supporting the upper tool carriers when working, said upper tool carriers having angular slots engaged by studs on said lower tool carriers, the connection constituting supports for the lower tool carriers, adjustable racks carried by said carriages and coacting with pinion shafts journaled to said frame for synchronizing the movements thereof, means limiting the rotational movement of said pinions, said upper feed carriage racks having toothless parts at their ends, whereby at the end of the retracting movement of the upper feed carriage the upper racks release their coacting pinions, permitting said lower feed carriage to retract under the influence of gravity until stopped by said limiting means engaging said pinion, work carriers for rotating the work in synchronism with the upper and lower master and upper tool carrier supporting crankshafts, means for driving said work carriers and said crankshafts in timed relation, means for operating said tool feed carriages comprising a feed carriage drive shaft journaled to said frame and having pinions engaging racks carried by said upper feed carriage, a piston rod having a rack engaging a pinion on the end of said drive shaft, an oil cylinder mounted on said frame for actuating said piston rod, means for supplying oil under pressure to said cylinder through a control valve, and means connected to said upper feed carriage for controlling said control valve.

2. In a machine of the class described, the combination of a supporting frame having angularly related ways, upper and lower tool feed carriages slidably coacting with said ways, upper and lower master crankshafts carried by said carriages, upper and lower tool carriers journaled to the throws of said master crankshafts, an upper tool carrier supporting crankshaft for supporting the upper tool carriers independently of the work, rollers journaled to the upper tool carriers for engaging the work opposite the upper and lower tools and supporting the upper tool carriers when working, said upper tool carriers having angular slots engaged by studs on said lower tool carriers, the connection constituting supports for the lower tool carriers, adjustable racks carried by said carriages and coacting with pinion shafts journaled to said frame for synchronizing the movements thereof, means limiting the rotational movement of said pinions, said upper feed carriage racks having toothless parts at their ends, whereby at the end of the retracting movement of the upper feed carriage the upper racks release their coacting pinions, permitting said lower feed carriage to retract under the influence of gravity until stopped by said limiting means engaging said pinion, work carriers for rotating the work in synchronism with the upper and lower master and upper tool carrier supporting crankshafts, means for driving said work carriers and said crankshafts in timed relation, and means for operating said tool feed carriages.

3. In a machine of the class described, the combination of a supporting frame having angularly related ways, upper and lower tool feed carriages slidably coacting with said ways, upper and lower master crankshafts carried by said carriages, upper and lower tool carriers journaled to the throws of said master crankshafts, an upper tool carrier supporting crankshaft for supporting the upper tool carriers independently of the work, rollers journaled to the upper tool carriers for engaging the work opposite the upper and lower tools and supporting the upper tool carriers when working, said upper tool carriers having angular slots engaged by studs on said lower tool carriers, the connection constituting supports for the lower tool carriers, adjustable racks carried by said carriages and coacting with pinion shafts journaled to said frame for synchronizing the movements thereof, work carriers for rotating the work in synchronism with the upper and lower master and upper tool carrier supporting crankshafts, means for driving said work carriers and said crankshafts in timed relation, means for operating said tool feed carriages comprising a feed carriage drive shaft journaled to said frame and having pinions engaging racks carried by said upper feed carriage, a piston rod having a rack engaging a pinion on the end of said drive shaft, an oil cylinder mounted on said frame for actuating said piston rod, means for supplying oil under pressure to said cylinder through a control valve, and means connected to said upper feed carriage for controlling said control valve.

4. In a machine of the class described, the combination of a supporting frame having angularly related ways, upper and lower tool feed carriages slidably coacting with said ways, upper and lower master crankshafts carried by said carriages, upper and lower tool carriers journaled to the throws of said master crankshafts, an upper tool carrier supporting crankshaft for supporting the upper tool carriers independently of the work, rollers journaled to the upper tool carriers for engaging the work opposite the upper and lower tools and supporting the upper tool carriers when working, said upper tool carriers having angular slots engaged by studs on said lower tool carriers, the connection constituting supports for the lower tool carriers, adjustable racks carried by said carriages and coacting with pinion shafts journaled to said frame for synchronizing the movements thereof, work carriers for rotating the work in synchronism with the upper and lower master and upper tool carrier supporting crankshafts, means for driving said work carriers and said crankshafts in timed relation, and means for operating said tool feed carriages.

5. In a machine of the class described, the combination of a supporting frame having angularly related ways, upper and lower tool feed carriages slidably coacting with said ways, upper and lower master crankshafts carried by said carriages, upper and lower tool carriers journaled to the throws of said master crankshafts, an upper tool carrier supporting crankshaft for supporting the upper tool carriers when not working, supporting rollers, journaled to one series of tool carriers for engaging the work opposite the tools, one series of said tool carriers having angular slots engaged by studs on the other series of tool carriers, the connection constituting a support for the lower tool carriers, racks carried by said carriages and coacting with pinion shafts journaled to said frame for synchronizing the movements thereof, means limiting the rotational movement of said pinions, said upper feed carriage racks having toothless parts at their ends, whereby at the end of the retracting movement of the upper feed carriage the upper racks release said pinions, permitting said lower feed carriage to retract under the influence of gravity until stopped by said limiting means engaging said pinion, work carriers for rotating the work in synchronism with the upper and lower master crankshafts, means for rotating said work carriers and said crankshafts, and means for operating said feed carriages comprising a feed carriage drive shaft journaled to said frame and having pinions engaging racks carried by said upper feed carriage, a piston rod having a rack engaging a pinion on the end of said drive shaft, a cylinder mounted on said frame for actuating said piston rod, means for supplying liquid under pressure to said cylinder through a control valve, and control means connected to said upper feed carriage for controlling said control valve.

6. In a machine of the class described, the combination of a supporting frame having angularly related ways, upper and lower tool feed carriages slidably coacting with said ways, upper and lower master crankshafts carried by said carriages, upper and lower tool carriers journaled to the throws of said master crankshafts, an upper tool carrier supporting crankshaft for supporting the upper tool carriers when not working, supporting rollers journaled to one series of tool carriers for engaging the work opposite the tools, one series of said tool carriers having angular slots engaged by studs on the other series of tool carriers, the connection constituting a support for the lower tool carriers, racks carried by said carriages and coacting with pinion shafts journaled to said frame for synchronizing the movements thereof, means limiting the rotational movement of said pinions, said upper feed carriage racks having toothless parts at their ends, whereby at the end of the retracting movement of the upper feed carriage the upper racks release said pinions, permitting said lower feed carriage to retract under the influence of gravity until stopped by said limiting means engaging said pinion, work carriers for rotating the work in synchronism with the upper and lower master crankshafts, means for rotating said work carriers and said crankshafts, and means for operating said feed carriages.

7. In a machine of the class described, the combination of a supporting frame having angularly related ways, upper and lower tool feed carriages slidably coacting with said ways, upper and lower master crankshafts carried by said carriages, upper and lower tool carriers journaled to the throws of said master crankshafts, an upper tool carrier supporting crankshaft for supporting the upper tool carriers when not working, supporting rollers journaled to one series of tool carriers for engaging the work opposite the tools, one series of tool carriers having angular slots engaged by studs on the other series of tool carriers, the connection constituting a support for the lower tool carriers, racks carried by said carriages and coacting with pinion shafts journaled to said frame for synchronizing the movements thereof, work carriers for rotating the work in synchronism with the upper and lower master crankshafts, means for rotating said work carriers and said crankshafts, and means for operating said feed carriages comprising a feed carriage drive shaft journaled to said frame and having pinions engaging racks carried by said upper feed carriage, a piston rod having a rack engaging a pinion on the end of said drive shaft, a cylinder mounted on said frame for actuating said piston rod, means for supplying liquid under pressure to said cylinder through a control valve, and control means connected to said upper feed carriage for controlling said control valve.

8. In a machine of the class described, the combination of a supporting frame having angularly related ways, upper and lower tool feed carriages slidably coacting with said ways, upper and lower master crankshafts carried by said carriages, upper and lower tool carriers journaled to the throws of said master crankshafts, an upper tool carrier supporting crankshaft for supporting the upper tool carriers when not working, supporting rollers journaled to one series of tool carriers for engaging the work opposite the tools, one series of said tool carriers having angular slots engaged by studs on the other series of tool carriers, the connection constituting a support for the lower tool carriers, racks carried by said carriages and coacting with pinion shafts journaled to said frame for synchronizing the movements thereof, work carriers for rotating the work in synchronism with the upper and lower master crankshafts, means for rotating said work carriers and said crankshafts, and means for operating said feed carriages.

9. In a machine of the class described, the combination with tool feed carriages disposed at an angle to each other, of means for actuating said tool feed carriages in synchronism, comprising a shaft having pinion gears engaging racks carried by said carriages, and adjustable means limiting the rotation of said shaft, whereby upon the release of said pinion gear by the upper rack, said lower carriage is lowered by gravity until stopped by the engagement of said shaft with said limiting means, the upper rack having a half tooth at its lower end for engaging said pinion gear on its down stroke and for releasing said pinion gear on its up stroke, and means for actuating and retracting the upper tool feed carriage.

10. In a machine of the class described the combination with tool feed carriages, of means for actuating said tool feed carriages in synchronism, comprising a shaft having pinion gears engaging racks carried by said carriages, and means limiting the rotation of said shaft, whereby upon the release of said pinion gear by the upper rack, said lower carriage is lowered by gravity until stopped by the engagement of said shaft with said limiting means, the upper rack having a half tooth at its lower end for engaging said pinion gear on its down stroke and for releasing said pinion gear on its up stroke, and means for actuating and retracting the upper tool feed carriage.

11. In a machine of the class described, the combination with tool feed carriages disposed at an angle to each other, of means for advancing and retracting said tool feed carriages in synchronism, comprising a shaft having pinion gears engaged by racks carried by said carriages, and adjustable means limiting the rotation of said shaft, whereby upon the release of said pinion gear by one rack, one carriage is lowered by gravity until stopped by the engagement of said shaft with said limiting means, said one rack having a half tooth at its end for engaging said pinion gear on its advance stroke and for releasing said pinion gear on its retract stroke, and means for advancing and retracting said one tool feed carriage.

12. In a machine of the class described, the combination with tool feed carriages disposed at an angle to each other, of means for advancing and retracting said tool feed carriages in synchronism, comprising a shaft having pinion gears engaged by racks carried by said carriages, and means limiting the rotation of said shaft, whereby upon the release of said pinion gear by one rack, one carriage is lowered by gravity until stopped by the engagement of said shaft with said limiting means, and means for advancing and retracting said one tool feed carriage.

13. In a machine of the class described, tool feed control mechanism comprising in combination, a tool feed carriage mounted for reciprocable movement, a hydraulic single-cylinder engine for advancing said carriage at its up stroke and retracting said carriage on its return stroke, a source of supply of oil under pressure connected to said engine through a valve, whereby it may be supplied to either end of the cylinder of the engine or shut off entirely, a reciprocable cam member connected to said carriage for movement therewith and having a cam slot having connected valve closed, open and partially open advance, closed and open, retract portions, a reciprocable valve control member having a cam follower coacting with said cam slot, and movable normal thereto, resilient means urging said control member to valve open retract position, a latch for holding said control member in valve closed position only against the force of said resilient means, and means actuated by the pressure built up on the advance stroke of said engine for tripping said latch.

14. In a machine of the class described, tool feed carriage control mechanism comprising in combination, a tool feed carriage mounted for reciprocable movement, a hydraulic single-cylinder engine for advancing said carriage at its up stroke and retracting said carriage on its return stroke, a source of supply of oil under pressure connected to said engine through a valve, whereby it may be supplied to either end of the cylinder of the engine or shut off entirely, a reciprocable cam member connected to said carriage for movement therewith and having a cam slot, a reciprocable valve control member having a cam follower coacting with said cam slot, and movable normal thereto, resilient means urging said control member to valve open retract position, a latch for holding said control member in valve closed position only against the force of said resilient means, and means for tripping said latch.

15. In a machine of the class described, tool feed carriage control mechanism comprising in combination, a tool feed carriage mounted for reciprocable movement, an engine for advancing said carriage at one stroke and retracting said carriage on the return stroke, a reciprocable cam member connected to said carriage for movement therewith and having a cam slot, a reciprocable engine control member having a cam follower coacting with said cam slot, resilient means urging said control member to engine retract position, latch means for holding said control member in engine stopped position only against the force of said resilient means, and means actuated by the pressure built up on the advance of said engine for tripping said latch means.

16. In a machine of the class described, carriage control mechanism comprising in combination, a carriage mounted for reciprocable movement, an engine for advancing said carriage at one stroke and retracting said carriage on the return stroke, a cam member connected to said carriage for movement therewith and having a cam slot, an engine control member having a cam follower coacting with said cam slot, resilient means urging said control member to engine retract position, latch means for holding said control member in engine stopped position only against the force of said resilient means, and means actuated by said engine for tripping said latch means.

17. In a machine of the class described, the combination with a pair of tool feed carriages disposed at an angle to each other, of means for advancing and retracting said tool feed carriages, comprising rack and pinion means connecting said carriages, whereby when one is advanced or retracted the other is similarly moved, an oil cylinder having a reciprocating piston, rack and pinion means connecting said piston to the upper tool feed carriage, an oil pump connected to said cylinder through a suitable control valve, means driving said oil pump, a cam member connected to said upper tool feed carriage and having a cam slot of substantially rectangular form having valve opening, open, partially open, closing, closed, advance and retract control portions, a cam follower pin coacting with said cam slot, a control member carrying said pin and connected to said control valve, a pivoted keeper adapted to engage a lug on said control member to latch it in open position, resilient means urging said control member to closed position, and a piston operated trip for actuating said keeper to release said control member to stop the advance of said carriages and start their retraction, and means connecting said cylinder to a casing for said piston operated trip, whereby the pressure built up within said cylinder at the end of the stroke of said piston is transmitted to and operates said piston operated trip.

18. In a machine of the class described, the combination with tool feed carriages disposed at an angle to each other, of means for advancing and retracting said tool feed carriages, comprising means connecting said carriages, whereby when one is advanced or retracted the other is similarly moved, an oil cylinder having a reciprocating piston, means connecting said piston to the upper tool feed carriage, an oil pump connected to said cylinder through a suitable control valve, means driving said oil pump, a cam member connected to said upper tool feed carriage and having a cam slot, a cam follower pin coacting with said cam slot, a control member carrying said pin and connected to said control valve, a pivoted keeper adapted to engage a lug on said control member to latch it in open position, resilient means urging said control member to closed position, and a piston operated trip for actuating said keeper to release said control member to stop the advance of said carriages and start their retraction, and means connecting said cylinder to a casing for said piston operated trip, whereby the pressure built up within said cylinder at the end of the stroke of said piston is transmitted to and operates said piston operated trip.

19. In a machine of the class described, the combination with a plurality of tool feed carriages disposed at an angle to each other, of means for actuating said tool feed carriages, comprising rack and pinion means connecting said carriages, whereby when one is actuated the other is similarly moved, a fluid cylinder having a reciprocating piston, rack and pinion means connecting said piston to one of said tool feed carriages, a fluid pump connected to said cylinder through a suitable control valve, means driving said pump, a cam member connected to one of said tool feed carriages and having a cam slot form having valve opening, open, partially open, closing, closed, advance and retract control portions, a cam follower coacting with said cam slot, a control member carrying said follower and connected to said control valve, a pivoted keeper adapted to engage a lug on said control member to latch it in open position, resilient means urging said control member to closed position, and a piston operated trip for actuating said keeper to release said control member to stop the advance of said carriages and start their retraction, and means connecting said cylinder to a casing for said piston operated trip whereby the pressure built up within said cylinder at the end of the stroke of said piston is transmitted to and operates said trip.

20. In a machine of the class described, the combination with a plurality of tool feed carriages disposed at an angle to each other, of means for actuating said tool feed carriages, comprising means connecting said carriages, whereby when one is actuated the other is similarly moved, a fluid cylinder having a reciprocating piston, means connecting said piston to one of said tool feed carriages, a fluid pump connected to said cylinder through a suitable control valve, means driving said pump, a cam member connected to one of said tool feed carriages and having a cam slot form having valve opening, open, partially open, closing, closed, advance and retract control portions, a cam follower coacting with said cam slot, a control member carrying said follower and connected to said control valve, a pivoted keeper adapted to engage a lug on said control member to latch it in open position, resilient means urging said control member to closed position, and a trip for actuating said keeper to release said control member, and means connecting said cylinder to a casing for said trip whereby the pressure built up within said cylinder at the end of the stroke of said piston is transmitted to and operates said trip.

21. In a machine of the class described, the combination with a pair of tool feed carriages disposed at an angle to each other, of means for actuating and retracting said tool feed carriages, comprising means connecting said carriages, whereby when one is actuated or retracted the other is similarly moved, means driving one of said carriages, control means therefor comprising a cam member connected to said one carriage and having an endless cam slot, a cam follower disposed in said slot, a reciprocable control member connected to said cam follower, resilient means urging said control member to closed position, means connecting said control member to said driving means, a pivoted keeper adapted to engage a lug on said control member when the latter is moved to open position, and means for tripping said keeper to release said control member when said carriages reach the ends of their travel, whereby to cause said driving means to retract said carriages.

22. In a machine of the class described, the combination with a plurality of tool feed carriages, means for actuating and retracting said tool feed carriages, comprising means connecting said carriages, whereby when one is actuated or retracted the other is similarly moved, means driving said carriages, and control means therefor, comprising a cam member connected to said one carriage and having an endless cam slot, a cam follower disposed in said cam slot, a reciprocable control member connected to said cam follower, resilient means urging said control member to closed position, means connecting said control member to said driving means, means adapted to engage said control member when the latter is moved to open position, and means for actuating said engaging means to release said control member when said carriages reach the forward ends of their travel.

23. In a machine of the class described, the combination with a supporting frame having spaced side members provided with angularly related inclined ways, of slides on said ways, master crankshafts journaled to said slides, and constituting therewith upper and lower tool feed carriages, upper and lower tool carriers journaled to the throws of said master crankshafts, said upper tool carriers having work engaging supporting rollers, tools secured to said carriers, means connecting the upper and lower tool carriers, whereby the lower tool carriers have a two-point suspension including said lower master crankshaft, means connecting said tool feed carriages for synchronous movement, actuating means for advancing and retracting said carriages relative to the work, means for driving the work and master crankshafts in synchronism, and means for controlling said work driving means and said feed actuating means, whereby upon the manual starting thereof, the feed carriages are advanced relatively fast during the initial part of their strokes and then relatively slow until the end of the stroke, whereupon the work driving means is stopped and the feed carriages are retracted and stopped.

24. In a machine of the class described, the combination with a supporting frame having spaced side members provided with angularly related inclined ways, of slides on said ways, master crankshafts journaled to said slides, and constituting therewith upper and lower tool feed carriages, upper and lower tool carriers journaled to the throws of said master crankshafts, said upper tool carriers having work engaging supporting rollers, tools secured to said carriers, means connecting the upper and lower tool carriers, whereby the lower tool carriers have a two-point suspension including said lower master crankshaft, means connecting said tool feed carriages for synchronous movement, actuating means for advancing and retracting said carriages relative to the work, and means for driving the work and master crankshafts in synchronism.

25. In a machine of the class described, the combination with a supporting frame having spaced side members provided with angularly related inclined ways, of slides on said ways, master crankshafts journaled to said slides, and constituting therewith upper and lower tool feed carriages, upper and lower tool carriers journaled to the throws of said master crankshafts, said upper tool carriers having work engaging supporting rollers, tools secured to said carriers in opposed relation to said rollers, means connecting the upper and lower tool carriers, whereby the lower tool carriers have a two-point suspension including said lower master crankshaft, means connecting said tool feed carriages for synchronous movement, actuating means for advancing and retracting said carriages relative to the work, and means for driving the work and master crankshafts in synchronism.

26. In a machine of the class described, the combination of slides on suitable inclined angularly related ways, master crankshafts journaled to said slides and constituting therewith tool feed carriages, tool carriers journaled to said crankshafts, one series of said tool carriers having supporting rollers for engaging the work, tools secured to said carriers in opposed relation to said rollers, means connecting the series of tool carriers whereby the tool carriers have a two-point suspension, means connecting said tool feed carriages for synchronous movement, actuating means for advancing and retracting said carriages relative to the work, means for driving the work and master crankshafts in synchronism, and means for controlling said work driving means and said feed actuating means, whereby upon the manual starting thereof the feed carriages are advanced relatively fast during the initial part of the work stroke and then relatively slow until the end of the stroke whereupon the work driving means is stopped and the feed carriages are retracted and stopped.

27. In a machine of the class described, the combination of slides on suitable inclined angularly related ways, master crankshafts journaled to said slides and constituting therewith tool feed carriages, tool carriers journaled to said crankshafts, one series of tool carriers having supporting rollers for engaging the work, tools secured to said carriers in opposed relation to said rollers, means connecting the series of tool carriers, whereby the tool carriers have a two-point suspension, means connecting said tool feed carriages for synchronous movement, actuating means for advancing and retracting said carriages relative to the work, means for driving the work and master crankshafts in synchronism, and means for controlling said work driving means and said feed actuating means.

28. In a machine of the class described, a control mechanism comprising in combination a reciprocable cam member having a cam slot, a cam follower reciprocable normal to the movement of said cam member, a pivoted manual control lever removably connected to said cam follower, means connecting said manual control lever to a two-way control valve, resilient means urging said cam follower in one direction, means for latching said cam follower against the force of said resilient means, means for releasing said latch in response to the position of said cam member, a controlled member, means for driving said member, means connecting said controlled member to said cam member, and means associating said control valve to said driving means.

29. In a machine of the class described, a control mechanism comprising in combination a cam member having a cam slot, a cam follower, a pivoted manual control lever removably connected to said cam follower, means connecting said manual control lever to a control valve, resilient means urging said cam follower in one direction, means for latching said cam follower against the force of said resilient means, means for releasing said latch in response to the position of said cam member, a controlled member, means for actuating said member, means connecting said controlled member to said cam member, and means associating said control valve to said driving means.

30. In a lathe, the combination with a rotatable work holder, tool feed carriages disposed at an angle to each other, means for actuating said feed carriages in synchronism, master crankshafts mounted on said tool carriages, tool carriers mounted on said master cranks, one series of said carriers having supporting rollers adapted to rest upon the work, tools mounted on said tool carriers in opposed relation to said rollers, and means for driving the work holder and said master crankshafts in synchronism.

31. In a lathe, the combination with a rotatable work holder, tool feed carriages disposed at an angle to each other, means for actuating said feed carriages in timed relation, master crankshafts mounted on said tool feed carriages, tool carriers mounted on the throws of said master crankshafts, the tool carriers mounted on one of said tool carriages having supporting rollers adapted to rest upon the work, a supporting crankshaft, connecting rods on the throws of said supporting crankshaft having lost motion connections with the carriers provided with the supporting rollers for supporting said carriers when they are disengaged from the work, the carriers having said supporting rollers having angular slots therein, the other series of tool carriers having supporting studs engaging said slots, and means for driving said master crankshafts and the work holder in synchronism and advancing and retracting said feed carriages in timed relation.

32. In a lathe, the combination with a rotatable work holder, of tool feed carriages disposed at an angle to each other, means for actuating said feed carriages in timed relation, master crankshafts mounted on said tool feed carriages, tool carriers mounted on the throws of said master crankshafts, the tool carriers mounted on one of said tool carriages having supporting rollers adapted to rest upon the work, the carriers having said supporting rollers having angular slots therein, the other series of tool carriers having supporting studs engaging said slots, and means for driving said master crankshafts and the work holder in synchronism and advancing and retracting said feed carriages in timed relation.

33. In a lathe, the combination with a rotatable work holder, of tool feed carriages disposed at an angle to each other, means for actuating said feed carriages in timed relation, master crankshafts mounted on said tool feed carriages, tool carriers mounted on the throws of said master crankshafts, the tool carriers mounted on one of said tool carriages having supporting rollers adapted to rest upon the work, a supporting crankshaft, connecting rods on the throws of said supporting crankshaft having lost motion connections with the carriers provided with the supporting rollers for supporting said carriers when they are disengaged from the work, and means for driving said master crankshafts and the work holder in synchronism and advancing and retracting said feed carriages in timed relation.

34. In a lathe, the combination with a rotatable work holder, of tool feed carriages disposed at an angle to each other, means for actuating said feed carriages in timed relation, master crankshafts mounted on said tool feed carriages, tool carriers mounted on the throws of said master crankshafts, the tool carriers mounted on one of said tool carriages having supporting rollers adapted to rest upon the work, and means for driving said master crankshafts and the work holder in synchronism and advancing and retracting said feed carriages in timed relation.

35. In a lathe, the combination with a rotatable work holder, of a tool feed carriage mounted to reciprocate radially of said work holder, a master crankshaft mounted on said tool feed carriage, tool carriers mounted on the throws of said crankshaft and having supporting rollers adapted to rest upon the work, and a supporting crankshaft having connecting rods with pin and slot connection to said carriers for supporting said carriers when they are disengaged from the work, the work holder and master crankshafts being rotated in timed relation.

36. In a lathe, the combination with a rotatable work holder, of a tool feed carriage mounted to reciprocate radially of said work holder, a master crankshaft mounted on said tool feed carriage, tool carriers mounted on the throws of said crankshaft and having supporting rollers adapted to rest upon the work, and a supporting crankshaft having connecting rods with lost motion connection to said carriers for supporting said carriers when they are disengaged from the work, the work holder and master crankshaft being rotated in timed relation.

37. In a lathe, the combination with a rotatable work holder, of a master crankshaft, tool carriers mounted on the throws of said crankshaft and having supporting rollers adapted to rest upon the work, and a supporting crankshaft having connecting rods with pin and slot connection to said carriers for supporting said carriers when they are disengaged from the work, the work holder and master crankshaft being rotated in timed relation.

38. In a lathe, the combination with a rotatable work holder, of a master crankshaft, tool carriers mounted on the throws of said crankshaft and having supporting rollers adapted to rest upon the work, and a supporting crankshaft having connecting rods with lost motion connection to said carriers for supporting said carriers when they are disengaged from the work, the work holder and master crankshafts being rotated in timed relation.

39. In a lathe, the combination with a rotatable work holder, of tool feed carriages disposed in operative relation to the work, means for actuating said feed carriages in timed relation, master crankshafts mounted on said tool feed carriages, and tool carriers mounted on the throws of said master crankshafts, the tool carriers mounted on one of the crankshafts having supporting rollers adapted to rest upon the work, the tool carriers mounted on the other crankshaft having supporting connections to the carriers provided with the rollers, the work holder and master crankshafts being rotated in timed relation.

40. In a lathe, the combination with a rotatable work holder, of tool feed carriages disposed in operative relation to the work, means for actuating said feed carriages in timed relation, master crankshafts mounted on said tool feed carriages, and tool carriers mounted on said master crankshafts, corresponding carriers of the two sets having a supporting connection, the work holder and master crankshafts being rotated in timed relation.

HERMAN W. MELLING.